United States Patent Office 3,218,303
Patented Nov. 16, 1965

3,218,303
FLUOROBUTADIENES, FLUOROBUTADIENE POLYMERS, AND PREPARATION OF THE SAME
John Lynde Anderson, Barrington, Ill., and Kenneth L. Berry, Hockessin, Del., assignors to E. I. du Pont de Nemours and Company, Wilmington, Del., a corporation of Delaware
No Drawing. Filed Feb. 10, 1958, Ser. No. 714,046
27 Claims. (Cl. 260—82.1)

This invention relates to, and has as its principal objects provision of, novel fluorine-containing dienes, polymers of the dienes and manufactures made therefrom, and methods for preparing all of the same.

This application is a continuation-in-part of copending U.S. application Serial No. 483,168, filed January 20, 1955, and now abandoned, which in turn was a continuation-in-part of application Serial No. 377,258, filed August 28, 1953, and also now abandoned.

The present invention provides a process wherein a fluorocyclobutene having, on the singly bonded carbons of the cyclobutene ring, only halogen atoms of which at least two are fluorine atoms, having hydrogen on at least one of the doubly bonded carbons of the cyclobutene ring, and having, as any remaining substituent, halogen, hydrocarbon or halogenated hydrocarbon is pyrolyzed at a temperature within the range of about 350° C. to about 900° C. and the resulting fluorobutadiene is isolated. The fluorocyclobutene starting materials can be prepared in situ, if desired, by pyrolysis of corresponding cyclobutanes having substituents which are converted to fluorocyclobutenes of the type defined above under the reaction conditions of this invention, i.e., at temperatures of 350° C. to 900° C. For example, 1-acetoxy-1-methyl-2,2,3,3-tetrafluorocyclobutane is convertible to 1-methyl-3,3,4,4-tetrafluorocyclobutene at a temperature of 600° C. and the resulting cyclobutene is in turn converted to 2-methyl-1,1,4,4-tetrafluorobutadiene at 500° C. to 725° C.

The new class of fluorinated butadienes of this invention has the formula

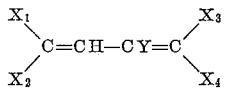

wherein the X's are halogens, at least two of which are fluorine, and Y is hydrogen, halogen, hydrocarbon, or halogenated hydrocarbon. A preferred type of fluorobutadiene has two fluorine atoms attached to one of the terminal carbon atoms.

Another aspect of the invention is that of the polymers, both homopolymers and copolymers, of the above novel fluorobutadienes. The polymers include both thermal polymers and linear addition polymers. The invention also includes fibers and films of the high molecular weight linear addition polymers of the above fluorobutadienes.

In the process of the present invention a fluorocyclobutene of the structure defined above, or a suitable precursor thereof which gives the fluorocyclobutene in situ, and preferably one having two fluorine atoms attached to one carbon atom, is passed through a reaction zone heated to a tempertaure of from 350° C. to 900° C., the exit gases being rapidly, e.g., within less than a minute, cooled to avoid side reactions. The lower temperatures in this range give significant conversions of the fluorocyclobutene to the fluorobutadiene. However, it is preferred to use pyrolysis temperatures of 500° C. to 725° C. since these higher temperatures give higher conversions, almost quantitative conversions being obtained at temperatures of around 650° C. to 700° C. Temperatures above 725° C. are generally undesirable because of the tendency for side reactions to take place at such high temperatures.

The pressure at which the pyrolysis of the fluorocyclobutenes is carried out is not critical, pressures ranging from a few microns of mercury to atmospheric or even superatmospheric being operable. In general, it is preferred to use the lower pressures, i.e., pressures of less than 50 mm. of mercury, in order to get the reaction products out of the reaction zone as rapidly as possible so that formation of undesirable by-products is minimized.

The rate at which the fluorocyclobutene is passed through the reaction zone is not critical, although for economical reasons it is preferred to use a rate as high as possible. It is only necessary to heat the fluorocyclobutene to the reaction temperature for a short time, e.g., a few milliseconds, to obtain the desired splitting of the cyclobutene ring. Any reasonable contact time is operable in this process; however, it is preferred that contact times of less than ten seconds at the pyrolysis temperature be used. The actual rate of gas flow through the reactor is dependent, of course, on the capacity of the heater surrounding the reaction zone. The greater the heat capacity of the heater the greater is the rate at which the fluorocarbon can be passed through the reaction zone.

The reactor can be constructed of any inert, heat-resistant material. For example, the reactor can be made of quartz, heat-resistant glass, stainless steel or other inert metals. The reactor can, if desired, be packed with inert materials, for example, granular quartz, to provide better heat transfer. Metals which react with the fluorocyclobutenes under the operating conditions to give undesirable by-products should not be used. The reaction zone can be heated by conventional heating means, for example, by electric or gas-fired heaters.

The fluorobutadienes of this invention are capable of being polymerized by conventional vinyl polymerization techniques to high molecular weight insoluble linear polymers. These fluorobutadienes are also polymerizable by thermal polymerization techniques to low molecular weight soluble polymers, e.g., dimers, trimers, tetramers, etc.

Linear high molecular weight addition polymers capable of forming strong fibers and films can be prepared from the fluorobutadienes of this invention by common bulk, solution, bead, or emulsion polymerization techniques, in the presence of free radical-liberating vinyl polymerization initiators. Useful initiators include the azo compounds of the type described in U.S. Patent 2,471,959 and peroxy compounds such as, for example, benzoyl peroxide and ammonium persulfate. Redox polymerization techniques can be employed. The polymerization can be carried out over a wide range of temperatures, for example, at temperatures of 0° C., or lower, up to 150° C., the exact temperature selected being one at which the initiator being used liberates free radicals readily. These high molecular weight linear addition polymers of the fluorobutadienes, and the fibers and films formed from them, are an important part of this invention.

In the termal polymerization of the fluorobutadienes, dimers, trimers, tetramers, and higher thermal polymers which are soluble in various organic solvents can be obtained by simply heating the fluorobutadiene to temperatures of 75° C. to 200° C. or more. This thermal polymerization reaction takes place even in the absence of a polymerization initiator, or in the presence of a vinyl addition polymerization inhibitor. The polymerization temperature is the important factor in the thermal polymerization reaction. In general, the higher the temperature of polymerization the higher is the molecular weight of the thermal polymer produced.

The following examples are given by way of illustration only and not by way of limitation, since the temperatures, pressures and starting materials may vary from those of the examples, within the scope of the above disclosure. While the invention is illustrated in the examples by the use of the fluoro- and fluorochlorocyclobutenes, the corresponding fluorobromo compounds may be used. In the examples the proportions are expressed in parts by weight unless otherwise specified.

EXAMPLE I

*Preparation of 1,1,4,4-tetrafluoro-1,3-butadiene*

One part of 3,3,4,4-tetrafluorocyclobutene is distilled through a cylindrical quartz tube one inch in diameter and 12 inches long filled with quartz packing and heated by an electric heater at 400° C. The reaction gases are led through a trap cooled by liquid nitrogen. The pressure, measured between the cold trap and the vacuum pump, is maintained at 1 micron of mercury. The reaction products are isolated in the cold tarp at a temperature of −196° C. The reaction products contain a significant amount of 1,1,4,4-tetrafluoro-1,3-butadiene, as indicated by infrared absorption analysis. The presence of strong absorption bands at 5.85, 7.55 and 7.60, 8.52 and 8.58, and 10.80 and 10.90 microns in the infrared absorption spectrum of 1,1,4,4-tetrafluoro-1,3-butadiene is consistent only with the structure of this compound.

Pyrolyses of 3,3,4,4-tetrafluorocyclobutene by the same method used above with the exception that the temperature of pyrolysis is 500° C., 600° C., and 700° C., respectively, give increasing conversions of the fluorocyclobutene to the corresponding fluorobutadiene as the temperature is increased.

EXAMPLE II

*Preparation of 1,1,4,4-tetrafluoro-1,3-butadiene*

Using the apparatus and procedure described in Examle I, 15 parts of 3,3,4,4-tetrafluorocyclobutene is pyrolyzed at 650° C. and 1 micron of mercury pressure. Virtually quantitative conversion of the tetrafluorocyclobutene to 1,1,4,4-tetrafluoro-1,3-butadiene is obtained, as shown by the infrared absorption spectrum of the product. The vapor pressure of the tetrafluorobutadiene is observed at various subzero temperatures and the extrapolated boiling point at atmospheric pressure is 4° C. Distillation of the product through an efficient fractionating column packed with glass helices gives 1,1,4,4-tetrafluoro-1,3-butadiene boiling at 4–5° C.

Addition of chlorine to 1,1,4,4-tetrafluoro-1,3-butadiene gives 1,2,3,4-tetrachloro-1,1,4,4-tetrafluorobutane boiling at 52–53° C./22 mm., or at 138° C./760 mm.

*Analysis.*—Calculated for $C_4H_2F_4Cl_4$: C, 17.95%; H, 0.75%; F, 28.35%; Cl, 53.00%; mol. wt., 268. Found: C, 17.94%; H, 1.16%; F, 28.2%; Cl, 52.68%; mol. wt., 270.

The 3,3,4,4-tetrafluorocyclobutene used as starting material in Examples I and II is prepared by dehydrochlorination of 1-chloro-2,2,3,3-tetrafluorocyclobutane, which is obtained by the cycloalkylation reaction of tetrafluoroethylene with vinyl chloride.

EXAMPLE III

*Preparation of 1,1,4,4-tetrafluoro-1,3-butadiene from 1-acetoxy-2,2,3,3-tetrafluorocyclobutane*

Using the apparatus described in Example I, 1915 parts of 1-acetoxy-2,2,3,3-tetrafluorocyclobutane is added dropwise to the reaction tube maintained at 700° C. and at 10 mm. pressure. The reaction products are collected in a trap cooled by liquid nitrogen. Distillation of the entire reaction product gives virtually no products other than 1,1,4,4-tetrafluoro-1,3-butadiene and acetic acid. The total yield of 1,1,4,4-tetrafluoro-1,3-butadiene is 900 parts, corresponding to 70% of the theoretical, with some products being lost mechanically during handling.

EXAMPLE IV

*Preparation of thermal polymers of 1,1,4,4-tetrafluoro-1,3-butadiene*

A mixture of 900 parts of 1,1,4,4-tetrafluoro-1,3-butadiene and 3 parts of a mixture of terpene hydrocarbons known to inhibit the polymerization of other fluorine-containing olefins is heated at 200° C. for 16 hours in a closed stainless steel reaction vessel at the autogenous pressure developed under these conditions. After cooling, the reaction vessel is opened and the reaction product is fractionally distilled. There are obtained 103 parts of a dimer of 1,1,4,4-tetrafluorobutadiene, believed to be cis-1,2-bis(2,2-difluorovinyl)-3,3,4,4 - tetrafluorocyclobutane, boiling at 99–100° C. and having a refractive index, $n_D^{25}$, of 1.3448; 280 parts of a trimer of tetrafluorobutadiene, believed to be cis-1-(2,2,3,3,6,6-hexafluoro-4-cyclohexenyl) - 2 - (2,2-difluorovinyl)-3,3,4,4-tetrafluorocyclobutane, boiling at 47–48° C./0.2 mm. and melting at 50° C.; 100 parts of a sublimable solid tetramer of tetrafluorobutadiene; and a nonvolatile residue amounting to 190 parts which is an ether-soluble polymer of 1,1,4,4-tetrafluorobutadiene having a molecular weight of 6,300 (determined ebullioscopically).

*Analysis of nonvolatile polymer.*—Calculated for $(C_4H_2F_4)_x$: C, 38.1%; H, 1.59%; F, 60.2%. Found: C, 38.61%; H, 1.82%; F, 59.2%.

These thermal polymers are useful as solvents for halogenated compounds, as stable compounds for heat transfer substances, and as chemical intermediates. For example, they can be hydrogenated and halogenated to saturated products which show markedly increased thermal and chemical stability, and they can be oxidized to polybasic acids of value in condensation polymerization.

EXAMPLE V

*Preparation of high molecular weight linear addition polymer of 1,1,4,4,-tetrafluoro-1,3-butadiene*

The storage of 400 parts of 1,1,4,4-tetrafluoro-1,3-butadiene in closed stainless steel containers for several months results in the accumulation of 8 parts of white, solid polymer, the stainless steel of the container apparently acting as polymerization initiator. This polymer has a high molecular weight as shown by its insolubility in all common organic solvents and in hot fuming nitric acid, and by its being substantially unaffected by concentrated aqueous alkali at room temperature. This polymer is molded at 350° C. under a pressure of about 2000 lbs./sk. in. in a hydraulic press to a very tough film of 5–6 mils thickness. This film has an X-ray melting point of 280° C.±5° C., and a cold crack temperature of −132° C., i.e., the lowest temperature at which the film can be sharply folded back on itself without being severed at the fold. This film of poly-1,1,4,4-tetrafluoro-1,3-butadiene is cut into strips 2 to 3 mm. in width and the strips are cold drawn to form very tough fibers showing high orientation by X-ray measurements.

EXAMPLE VI

*Preparation of linear addition polymer of 1,1,4,4-tetrafluoro-1,3-butadiene*

Very tough fibers are also obtained from strips of the above film by drawing at 140° C.

A mixture of 126 parts of 1,1,4,4-tetrafluoro-1,3-butadiene and 10 parts of benzoyl peroxide is sealed in a glass tube and is allowed to stand at room temperature (20°–25° C.) for two weeks in intermittent sunlight and then for ten weeks in the dark. At the end of this time there is isolated from the reaction mixture 44 parts of a high molecular weight polymer of 1,1,4,4-tetrafluoro-1,3-butadiene. This polymer is molded to a very clear tough film at 325° C. under a pressure of about 2000 lbs./sq. in. in a hydraulic press. This polymer is similar in properties to that of Example V.

EXAMPLE VII

*Preparation of linear addition polymer of 1,1,4,4-tetrafluoro-1,3-butadiene*

Five hundred parts of 1,1,4,4-tetrafluoro-,3-butadiene is held at 75° C. for ten days and at room temperature (20–30° C.) for seven days in a stainless steel container. After removal of excess monomer from the reaction mixture, there is obtained 12.5 parts of very high molecular weight polymer of 1,1,4,4-tetrafluoro-,3-butadiene. This polymer is pressed into a film 6 mils thick at 360° C. at about 2000 lbs./sq. in. pressure during a period of two minutes. This film is cut into strips 2 to 3 mm. wide and the strips are cold drawn to fine, highly oriented fibers.

EXAMPLE VIII

*Preparation of copolymers of tetrafluorobutadiene with nitrosyl chloride*

Sixty-six parts of nitrosyl chloride and 63 parts of tetrafluorobutadiene are sealed in a glass tube built to withstand pressures and allowed to warm to approximately 10° C. over a 16-hour period. The contents of the tube have gelled by the end of this time. On opening, the resulting copolymer is purified by pulling down at room temperature in vacuo. The residue is a rubbery elastomer with considerable bounce. This product is milled on a rubber mill to give a product resembling crude rubber.

Another preparation similar to that described above is carried out using 33 parts of nitrosyl chloride and 63 parts of tetrafluorobutadiene. The elastomeric copolymer obtained is similar to that described above. These elastomers are not soluble in the following solvents at room temperature: dimethylformamide, benzene, acetic acid, chloroform, and trichloroethylene.

One hundred and twenty-six parts of tetrafluorobutadiene and 66 parts of nitrosyl chloride are sealed in a glass tube constructed to withstand pressure and placed in sunlight for 18 hours at 0° C. The resulting solid is washed with water in a Waring blender and then milled with a tetrachloroethylene wash to give an elastomeric copolymer. This product analyzes as follows:

*Analysis.*—Calculated for $C_8H_4F_8NOCl$: C, 29.2%; H, 1.26%; F, 47.8%; Cl, 11.18%; N, 4.40%. Found: C, 30.62%; H, 1.49%; F, 46.24%; Cl, 10.16%; N, 4.32%.

This copolymer is believed to be a copolymer of tetrafluorobutadiene with the adduct of NOCl with tetrafluorobutadiene, having the recurring units

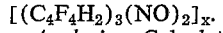

EXAMPLE IX

*Preparation of copolymers of 1,1,4,4,-tetrafluoro-1,3-butadiene with nitric oxide*

A stainless steel bomb is charged with 40 parts of perfluorodimethylcyclohexane and 7 parts of 1,1,4,4-tetrafluoro-1,3-butadiene. The bomb is cooled, evacuated and heated to 10° C. and nitric oxide is introduced until a pressure of 100 lb./sq. in. is obtained. The mixture is then heated under these conditions for 16 hours. After cooling and opening the bomb, there is obtained 9 parts of a white, finely divided copolymer of 1,1,4,4-tetrafluorobutadiene and nitric oxide of the composition $[(C_4F_4H_2)_3(NO)_2]_x$.

*Analysis.*—Calculated for $[(C_4F_4H_2)_3(NO)_2]_x$: N, 6.4%. Found: N, 6.7, 7.0, 6.8%.

This highly crosslinked copolymer is stable at temperatures up to 250° C.

When the process of Example IX is repeated with different proportions of tetrafluorobutadiene and nitric oxide, the products obtained always have the same composition. This shows that the products are not homopolymers of tetrafluorobutadiene modified with nitric oxide but are true copolymers.

EXAMPLES X–XII

*Preparation of copolymers of 1,1,4,4-tetrafluoro-1,3-butadiene with acrylonitrile*

Glass tubes are sealed with the amounts of acrylonitrile (AN) and 1,1,4,4-tetrafluoro-1,3-butadiene (TFBD) listed in the following Table I and with 0.1 part of $\alpha,\alpha'$-azobis-(isobutyronitrile) and 25 parts of tertiary-butyl alcohol. The tubes are then sealed and heated to 70° C. for 17 hours. After cooling, the tubes are opened and the polymer is isolated from each is washed with methanol and dried in vacuo.

TABLE I

| Example | Comonomers | | Mol Ratio, AN/TFBD Charged | Copolymer, parts | AN/TFBD [1] Mol Ratio in Polymer |
|---|---|---|---|---|---|
| | AN, parts | TFBD, parts | | | |
| X | 5.3 | 5.9 | 2/1 | 6.1 | 16/1 |
| XI | 2.6 | 6.3 | 1/1 | 2.1 | 10/1 |
| XII | 2.6 | 10.1 | 1/1.6 | 2.4 | 7/1 |

[1] The mol ratio of acrylonitrile and tetrafluorobutadiene in the copolymers is calculated from elemental analyses.

EXAMPLES XIII–XV

*Preparation of copolymers of 1,1,4,4-tetrafluoro-1,3-butadiene with styrene*

Copolymers of 1,1,4,4-tetrafluoro-1,3-butadiene and styrene are prepared by the general method described in Examples X–XII, using the amounts of comonomers listed in the following Table II with 0.1 part of $\alpha,\alpha'$-azobis-(isobutyronitrile) and 16 parts of tertiary-butyl alcohol.

TABLE II

| Example | Comonomers | | Mol Ratio, Styrene/TFBD Charged | Copolymer, parts | Mol Ratio [1] Styrene/TFBD in Polymer |
|---|---|---|---|---|---|
| | Styrene, parts | TFBD, parts | | | |
| XIII | 5.2 | 7.8 | 3/4 | 1.3 | 15/1 |
| XIV | 5.2 | 5.3 | 6/5 | 1.6 | 12/1 |
| XV | 5.2 | 2.6 | 12/5 | 2.4 | 35/1 |

[1] The mol ratio of styrene and tetrafluorobutadiene in the copolymer is calculated from elemental analyses.

EXAMPLE XVI

*Preparation of copolymer of 1,1,4,4-tetrafluoro-1,3-butadiene with vinyl 2,2,3,3-tetrafluoropropionate*

A platinum tube 6″ in length, ½″ in diameter and sealed at one end is charged with 0.1 part of $\alpha,\alpha'$-azobis-(isobutyronitrile), 7.8 parts of 1,1,4,4-tetrafluoro-1,3-butadiene and 1 part of vinyl 2,2,3,3-tetrafluoropropionate. The tube is flushed with nitrogen, then sealed and heated to 80° C. for 16 hours under a helium pressure of 2500 atmospheres. The copolymer obtained is treated with acetone to remove impurities and is dried in vacuo.

This copolymer of 1,1,4-4-tetrafluorobutadiene and vinyl 2,2,3,3-tetrafluoropropionate amounts to 7.04 parts. On analysis, this copolymer is found to contain 37.55% C, 1.65% H, and 58.19% F. These data indicate the copolymer composition to be 90% diene and 10% vinyl ester. The composition of the comonomers charged was 91% diene and 9% ester. This copolymer is pressed at 300° C. under 19,000 lbs. pressure to a clear film which is stiff, tough, and has excellent tear resistance.

EXAMPLES XVII–XIX

*Preparation of copolymers of 1,1,4,4-tetrafluoro-1,3-butadiene with 2-methyl-1,1,4,4-tetrafluorobutadiene*

A stainless steel bomb is charged in separate runs with 0.05 part of benzoyl peroxide and the quantities of 1,1,4,4-tetrafluorobutadiene (TFBD) and 2-methyl-1,1,4,4-tetrafluorobutadiene (TFI) listed in following Table III. Distilled water is injected into the bomb until a pressure of 2500 atmospheres is reached and the tube is heated at 90° C. for 16 hours. After cooling, the bomb is opened and the polymer is washed with acetone and dried in vacuo.

TABLE III

| Example | Comonomers | | Mol Ratio, TFBD/TFI Charged | Copolymer parts | TFBD/TFI[1] Mol Ratio in Polymer |
|---|---|---|---|---|---|
| | TFBD, parts | TFI, parts | | | |
| XVII | 9.6 | 2.0 | 8/2 | 8.1 | 8/2 |
| XVIII | 2.9 | 8.0 | 3/7 | 3.8 | 2/8 |
| XIX | 6.2 | 5.0 | 6/4 | 3.1 | 3/7 |

[1] The mol ratio of tetrafluorobutadiene and methyltetrafluorobutadiene in the copolymers is calculated from elemental analyses.

The copolymer having a TFBD/TFI mol ratio of 8/2 is pressed at 250° C. under 15,000 lbs. pressure to a clear film which is flexible and has good tear strength. The copolymer having a TFBD/TFI ratio of 2/8 is pressed at 100° C. under 15,000 lbs. pressure to a clear film which is tough and very flexible and can be cold drawn. The film has a tensile strength of 1500 lb./sq. in., an elongation of 350% and a tensile modulus of 33,000 lb./sq. in. The copolymer having a mol ratio of 3/7 is pressed at 115° C. under 8000 lbs. pressure to a clear film which can also be cold drawn.

EXAMPLE XX

*Preparation of 2-chloro-1,1,4,4-tetrafluoro-1,3-butadiene*

Ninety-nine parts of 1-chloro-3,3,4,4-tetrafluorocyclobutene (prepared by dehydrochlorination with aqueous alkali of 1,1-dichloro-2,2,3,3-tetrafluorocyclobutane prepared in turn by the cyclization as in Barrick U.S. 2,462,345 of tetrafluoroethylene and vinylidene chloride) is distilled through a quartz pyrolysis tube of the type described in Example I at 10 mm. of mercury pressure at a temperature of 700° C. There is obtained in the cold trap 64 parts of 2 - chloro - 1,1,4,4 - tetrafluoro - 1,3 - butadiene. This corresponds to a 65% conversion and 100% yield of the butadiene.

Infrared absorption spectra of 2-chloro-1,1,4,4-tetrafluoro-1,3-butadiene show very strong absorption bands at 5.73, 5.76, and 5.83 microns which are consistent with the structure of this compound. This butadiene boils at 45° to 46° C. and has a refractive index, $n_D^{25}$, of 1.3552.

*Analysis.*—Calculated for $C_4HClF_4$: Cl, 22.1%; M.W., 160.5. Found: Cl, 21.78%; M.W., 162.

This diene exhibits algicidal activity against *Chlorella pyrenoidosa.*

EXAMPLE XXI

*Preparation of thermal polymers of 2-chloro-1,1,4,4-tetrafluoro-1,3-butadiene*

A glass reaction vessel capable of withstanding pressure is charged with 200 parts of 2-chloro-1,1,4,4-tetrafluoro-1,3-butadiene, and 1 part each of hydroquinone and phenothiazine. The vessel is sealed and then heated at 105–107° C. for 48 hours. After cooling, the reaction vessel is opened and the reaction mixture is subjected to fractional distillation. There are obtained 77 parts of a dimer of 2-chloro-1,1,4,4-tetrafluoro-1,3-butadiene boiling at 65–66° C./30 mm. and having a refractive index, $n_D^{25}$, of 1.3950 and a higher boiling residue.

In a similar experiment, there are obtained the dimer and a trimer of 2-chloro-1,1,4,4-tetrafluoro-1,3-butadiene boiling at 65.5° C./0.1 mm. and having a refractive index, $n_D^{25}$, of 1.4279. Analyses of these two fractions confirm the molecular weight of the dimer and trimer, respectively.

The dimer and trimer of 2-chloro-1,1,4,4-tetrafluoro-1,3-butadiene can be oxidized to polycarboxylic acids of value in polycondensation reactions and as intermediates for esterification to ester plasticizers.

EXAMPLE XXII

*Preparation of addition polymers of 2-chloro-1,1,4,4-tetrafluoro-1,3-butadiene*

A reaction vessel is charged, under an atmosphere of nitrogen so as to exclude oxygen, with 60 parts of deoxygenated distilled water, 3 parts of the sodium salt of a long chain alkyl sulfate, 10 parts of 2-chloro-1,1,4,4-tetrafluoro-1,3-butadiene and 0.2 part of $\alpha,\alpha'$-azo-bis(isobutyronitrile). The vessel is closed and then tumbled at 75° C. for 17.5 hours. After cooling the reaction mixture is poured into 120 parts of methanol. The precipitated polymer is isolated by filtration and then dried. There is obtained 4 parts of solid addition polymer of 2-chloro-1,1,4,4-tetrafluoro-1,3-butadiene. This polymer is soluble in hot xylene but not in xylene at room temperature.

Similar results are obtained when the initiator of the above polymerization system is replaced with 0.2 part of benzoyl peroxide or with a mixture of 0.1 part of potassium persulfate, 0.05 part of sodium bisulfite and 0.5 part of sodium hydroxide. With these two initiator systems, yields of solid polymers of 2-chloro-1,1,4,4-tetrafluoro-1,3-butadiene amounting to 3.5 parts and 1.7 parts, respectively, are obtained.

EXAMPLE XXIII

*Preparation of 2-phenyl-1,1,4,4-tetrafluoro-1,3-butadiene*

Fifteen parts of 1-phenyl-3,3,4,4-tetrafluorocyclobutene (prepared by the cycloalkylation of tetrafluoroethylene with phenylacetylene as in Barrick U.S. 2,462,346) is added dropwise to a quartz pyrolysis tube of the type used in Example I. The reactor is maintained at 700° C. and at a pressure of 10 microns of mercury (measured between the cold trap and the vacuum pump). There is obtained in the cold trap 6 parts of 2-phenyl-1,1,4,4-tetrafluoro-1,3-butadiene boiling at 45° C./7 mm. and having a refractive index, $n_D^{24}$, of 1.4702. Six parts of the tetrafluorocyclobutene is recovered. This corresponds to a 40% conversion of the cyclobutene to the butadiene, with a 66% yield of the desired 2-phenyl-1,1,4,4-tetrafluoro-1,3-butadiene.

*Analysis.*—Calculated for $C_{10}H_6F_4$: C, 59.4%; H, 2.97%; F, 37.7%; M.W., 202. Found: C, 59.58%; H, 3.46%; F, 37.8%; M.W., 205.

Infrared analysis of 2-phenyl-1,1,4,4-tetrafluoro-1,3-butadiene shows strong absorption bands at 5.73 and 5.85 microns. These absorption bands are consistent with the indicated structure of this compound.

EXAMPLE XXIV

*Preparation of 2-phenyl-1,1,4,4-tetrafluoro-1,3-butadiene at atmospheric pressure*

One part of 1-phenyl-3,3,4,4-tetrafluorocyclobutene at atmospheric pressure in the presence of nitrogen is passed through a quartz pyrolysis tube maintained at 475° C.

There is a substantial conversion of the fluorocyclobutene to 2-phenyl-1,1,4,4-tetrafluoro-1,3-butadiene, as shown by infrared absorption spectra of the reaction product obtained in the cold trap. However, the reaction product is much less pure than the product obtained by pyrolysis of the same fluorocyclobutene at pressures of 10 mm. of mercury or less.

EXAMPLE XXV

*Preparation of 1-chloro-1,4,4-trifluoro-2-phenyl-1,3-butadiene*

Twenty parts of 1-phenyl-3,3,4-trifluoro-4-chlorocyclobutene (prepared by cycloalkylation of chlorotrifluoroethylene and phenylacetylene) is added dropwise through a quartz tube maintained at 700° C. at less than 10 microns of mercury pressure (measured between the cold trap and the vacuum pump). The pyrolysis products are isolated in a cold trap maintained at a temperature of −80° C. There is obtained 7 parts of 1-chloro-1,4,4-trifluoro-2-phenyl-1,3-butadiene having a boiling point of 86° C./7 mm. and a refractive index, $n_D^{25}$, of 1.5071.

Infrared analysis of the crude 1-chloro-1,4,4-trifluoro-2-phenyl-1,3-butadiene shows a strong absorption band at 5.80 microns. This absorption band is consistent with the indicated structure of the product.

EXAMPLE XXVI

*Preparation of 2-methyl-1,1,4,4-tetrafluoro-1,3-butadiene*

Four parts of 1-methyl-3,3,4,4-tetrafluorocyclobutene (prepared by pyrolysis of 1-acetoxy-1-methyl-2,2,3,3-tetrafluorocyclobutane at 600° C. at 10–20 microns of mercury pressure) is added by distillation to a quartz pyrolysis tube maintained at 650° C. at 10–20 microns of mercury pressure. There is obtained in the cold trap 3 parts of 2-methyl-1,1,4,4-tetrafluoro-1,3-butadiene.

Optionally 2 - methyl-1,1,4,4-tetrafluoro-1,3-butadiene can be prepared directly from 1-acetoxy-1-methyl-2,2,3,3-tetrafluorocyclobutane by passing the acetoxy derivative through a quartz pyrolysis tube maintained at 650° C. and 10–20 microns of mercury pressure.

EXAMPLE XXVII

*Preparation of dimer of 2-methyl-1,1,4,4-tetrafluoro-1,3-butadiene*

A mixture of 125 parts of 2-methyl-1,1,4,4-tetrafluoro-1,3-butadiene and 0.10 part of benzoyl peroxide is placed in a glass reaction vessel capable of withstanding pressure. The tube is sealed and then heated at 105° C. for 48 hours. Distillation of the reaction mixture in the glass vessel gives 27 parts of a dimer of 2-methyl-1,1,4,4-tetrafluoro-1,3-butadiene boiling at 56° C./28 mm. and having a refractive index, $n_D^{25}$, of 1.3702.

*Analysis.*—Calculated for $C_5H_4F_4$: C, 42,8%; H, 2.86%; F, 54.3%; M.W., 280. Found: C, 42.32%; H, 3.34%; F, 54.6%; M.W., 261.

The dimer of 2-methyl-1,1,4,4-tetrafluoro-1,3-butadiene can be oxidized to a dicarboxylic acid which is useful for condensation with dihydric alcohols to form polyesters.

EXAMPLE XXVIII

*Preparation of 1,1-dichloro-4,4-difluoro-2-phenyl-1,3-butadiene*

Forty parts of 1-phenyl-3,3-difluoro-4,4-dichlorocyclobutene (prepared by cycloalkylation of dichlorovinylidene fluoride with phenylacetylene) is added dropwise to a quartz pyrolysis tube maintained at 700° C. at 10 mm. of mercury pressure. There is obtained 30 parts of 1,1-dichloro-4,4-difluoro-2-phenyl-1,3-butadiene, boiling at 72–73° C./4 mm.

*Analysis.*—Calculated for $C_{10}H_6F_2Cl_2$: C, 51.1%; H, 2.55%. Found: C, 50.85%; H, 2.79%.

1,1 - dichloro - 2,4-difluoro-2-phenyl-1,3-butadiene exhibits marked activity as a bactericide. For example, this butadiene at a concentration of 62.5 micrograms/milliliter shows complete kill of *Micrococcus pyogenes* var. *aureus*, H strain, and at a concentration of 31.25 micrograms/milliliter it shows a complete kill of *Streptococcus faecalis*, 10 Cl.

EXAMPLE XXIX

*Preparation of 2 - chloromethyl - 1,1,4,4 - tetrafluoro-1,3-butadiene*

Two parts of 1-chloromethyl-3,3,4,4-tetrafluorocyclobutene is distilled through a quartz reaction tube of the type described in Example I maintained at 650° C. and 10 mm. of mercury pressure. There is collected in the cold trap maintained at −196° C., 1 part of reaction product. On distillation of this product in vacuo there is obtained one-half part of product consisting largely of 2-chloromethyl-1,1,4,4 - tetrafluoro-1,3-butadiene. This boils at 60° C./117 mm., and has a refractive index, $n_D^{25}$, of 1.3632.

*Analysis.*—Calculated for $C_5H_3ClF_4$: C, 34.4%; H, 1.72%. Found: C, 34.48%; H, 1.96%.

Pyrolysis of the same cyclobutene used in Example XXIX by the same procedure except that the reaction zone is maintained at 550° C. gives similar results.

The process of this invention for the preparation of the fluorobutadienes of this invention has been illustrated by specific reference in the examples to the pyrolysis of certain fluorocyclobutenes. However, the process is applicable to any fluorocyclobutene having only halogen atoms, at least two being fluorine atoms, on the singly bonded ring carbons of the cyclobutene ring, having hydrogen on at least one of the doubly bonded ring carbons, with any other ring substituent being halogen, hydrocarbon, or halogenated hydrocarbon. Additional specific examples of fluorocyclobutenes which are operable include:

3,3-dichloro-1-(p-chlorophenyl)-4,4-difluorocyclobutene;
3-chloro-1-ethyl-3,4,4-trifluorocyclobutene;
1,4-dibromo-3,3,4-trifluorocyclobutene;
3-bromo-3,4,4-trifluoro-1-isobutylcyclobutene;
3,3,4,4-tetrafluoro-1-perfluoro-n-propylcyclobutene;
3,3-dichloro-4,4-difluoro-1-trichloromethylcyclobutene;
4-bromo-3,3,4-trifluoro-1-vinylcyclobutene;
3,3-dichloro-1-ethynyl-4,4-difluorocyclobutene;
1-n-dodecyl-3,3,4,4-tetrafluorocyclobutene;
3-chloro-1,3,4,4-tetrafluorocyclobutene;
3,3,4,4-tetrafluoro-1-(1-naphthyl)cyclobutene; and
1,3,3,4,4-pentafluorocyclobutene.

Fluorocyclobutene intermediates for use in the process of the present invention can be prepared by known methods, e.g., those of Barrick, U.S. Patents 2,462,345–6.

Similarly, the products of this invention include other fluorobutadienes besides those specifically mentioned in the examples. Fluorobutadienes of the structure

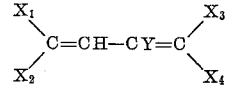

wherein the X's are halogens, at least two of which are fluorine, and in which Y is hydrogen, halogen, hydrocarbon, or halogenated hydrocarbon are included in the present invention and can be made by the process hereof. Specific examples of other products which are included are the following:

4,4-dichloro-2-(p-chlorophenyl)-1,1-difluoro-1,3-butadiene;
4-chloro-2-ethyl-1,1,4-trifluoro-1,3-butadiene;
1,2-dibromo-1,4,4-trifluoro-1,3-butadiene;
4-bromo-2-isobutyl-1,1,4-trifluoro-1,3-butadiene;
1,1,4,4-tetrafluoro-2-(perfluoro-n-propyl)-1,3-butadiene;
4,4-dichloro-1,1-difluoro-2-trichloromethyl-1,3-butadiene;
1-bromo-1,4,4-trifluoro-2-vinyl-1,3-butadiene;
4,4-dichloro-2-ethynyl-1,1-difluoro-1,3-butadiene;
2-n-dodecyl-1,1,4,4-tetrafluoro-1,3-butadiene;
4-chloro-1,1,2,4-tetrafluoro-1,3-butadiene;
1,1,4,4-tetrafluoro-2-(1-naphthyl)-1,3-butadiene; and
1,1,2,4,4-pentafluoro-1,3-butadiene.

The above are intended merely to show typical butadienes falling within the scope of the invention. It is to be understood that the X's may be the same or different as long as at least two are fluorine.

Y may be any hydrocarbon or halogenated hydrocarbon radical since its precise nature does not affect the conversion of the butene by pyrolysis, although the group does have an effect on the properties of the fluorobutadiene produced. The group may be aliphatic or aromatic, saturated or unsaturated, provided it remains a hydrocarbon or halogenated hydrocarbon.

The examples have illustrated the use of a mixture of terpene hydrocarbons, and a mixture of hydroquinone and phenothiazine as addition polymerization inhibitors in the preparation of thermal polymers of the fluorinated butadienes of this invention. However, other conventional addition polymerization inhibitors may be employed. For example, copper resinate, $\beta$-naphthol, and the naphthylamines are also operable.

The fluorobutadienes of this invention are useful for a wide variety of purposes. They are particularly useful for self-condensation to dimers, trimers, tetramers, and higher thermal polymers. They are also particularly useful for addition polymerization to high molecular weight polymers, including homopolymers and copolymers with one or more copolymerizable monomers, which are in turn useful for the formation of films and fibers. These films and fibers are exceptionally resistant to organic solvents, acids and alkali and are useful over the temperature range of $-130°$ C. to $280°$ C.

As indicated above, the fluorobutadienes of this invention can be copolymerized with one or more other polymerizable monomers. Examples of such copolymerizable monomers are the polymerizable ethylenic compounds such as, for example, ethylene, propylene, butadiene, isoprene, chloroprene, fluoroprene, styrene, acrylonitrile, methyl methacrylate, ethyl acrylate, vinyl acetate, vinyl fluoride, vinyl chloride, vinylidene fluoride, tetrafluoroethylene, chlorotrifluoroethylene, hexafluoropropene, vinyl perfluorobutyrate, vinyl tetrafluoropropionate, 1-vinyl-2,2,3,3-tetrafluoro-1-cyclobutene, and 1-methyl-3-methylenecyclobutane. Furthermore, the fluorobutadienes of this invention can be reacted with nitrosyl chloride or with nitric oxide as in Examples VIII and IX to give adducts which copolymerize with the fluorobutadiene to form copolymers. The copolymers of the adduct of tetrafluorobutadiene with nitrosyl chloride are synthetic rubbers, while the copolymers of the adduct of tetrafluorobutadiene with nitric oxide are highly crosslinked infusible copolymers.

The fluorobutadienes of this invention are also useful as chemical intermediates. For example, they can be halogenated to the corresponding saturated fluorohalocarbons or hydrogenated to fluorohydrocarbons. The thermal polymers, i.e., dimers, trimers, tetramers, etc., are also useful as chemical intermediates. For example, they can be oxidized with aqueous potassium permanganate or nitric acid to polyhalocyclobutyl polycarboxylic acids. The resulting polycarboxylic acids can be reacted with polyhydric alcohols to form alkyd resins. The dimers and trimers of the fluorobutadienes of this invention are also useful as solvents and as modifiers for polymeric materials, the higher boiling thermal polymers being useful as plasticizers. The high molecular weight polyfluorobutadienes of this invention in the form of films and fibers woven into fabrics are useful insulating materials in electrical apparatus.

Fluorobutadienes of this invention also exhibit biological activity. Certain compounds show marked activity as algicides and bactericides.

The process of this invention possesses several advantages over the hitherto known methods of preparing fluorobutadienes. In particular, this process provides high yields of the desired fluorobutadienes from intermediates which do not require the use of elemental fluorine in their preparation. These are important advantages for large-scale preparation of fluorobutadienes. Furthermore, the process of this invention does not involve breaking a cycloolefin into more than one product. In other words, the butadiene obtained in this process has the same molecular weight as the cyclobutene from which it is derived.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. The process of preparing a fluoro-1,3-butadiene which comprises pyrolyzing at a temperature between about 350° C. and 900° C. a fluorocyclobutene having, on the singly bonded ring carbons, only halogens of atomic number not greater than 35, having hydrogen on at least one of the doubly bonded ring carbons, having two fluorine atoms on one of the singly bonded ring carbons, and having any remaining ring substituent selected from the class consisting of halogen of atomic number not greater than 35, halogenated hydrocarbon wherein the halogen is of atomic number not greater than 35, and hydrocarbon.

2. The process of claim 1 in which the pyrolysis is carried out at a temperature between about 500° C. and 725° C.

3. The process of claim 1 in which the pyrolysis is carried out at a pressure less than 50 mm. of mercury.

4. A fluoro-1,3-butadiene having the formula

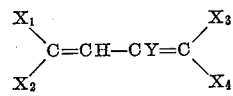

in which each X is a halogen of atomic number not greater than 35, at least two of which are fluorine with two fluorines on one of the two terminal carbon atoms, and Y is selected from the group consisting of hydrogen, halogen of atomic number not greater than 35, hydrocarbon, and halogenated hydrocarbon wherein the halogen is of atomic number not greater than 35.

5. 1,1,4,4-tetrafluoro-1,3-butadiene.
6. A polymer of the fluorobutadiene of claim 4.
7. A polymer of 1,1,4,4-tetrafluoro-1,3-butadiene.
8. A linear polymer of the fluorobutadiene of claim 4.
9. An oriented fiber of a linear polymer of the fluorobutadiene of claim 4.
10. A film of a linear polymer of the fluorobutadiene of claim 4.
11. An oriented poly-1,1,4,4-tetrafluoro-1,3-butadiene fiber.
12. A poly-1,1,4,4-tetrafluoro-1,3-butadiene film.
13. A tough, moldable, orientable linear polymer of 1,1,4,4-tetrafluoro-1,3-butadiene.
14. A copolymer of the fluorobutadiene of claim 4 with at least one other copolymerizable ethylenically unsaturated monomer.
15. A copolymer of 1,1,4,4-tetrafluoro-1,3-butadiene with another copolymerizable ethylenically unsaturated monomer.
16. A copolymer of 1,1,4,4-tetrafluoro-1,3-butadiene with 2-methyl-1,1,4,4-tetrafluorobutadiene.
17. A copolymer of 1,1,4,4-tetrafluoro-1,3-butadiene with acrylonitrile.
18. A copolymer of 1,1,4,4-tetrafluoro-1,3-butadiene with styrene.
19. A copolymer of 1,1,4,4-tetrafluoro-1,3-butadiene with nitrosyl chloride.

20. A copolymer of 1,1,4,4-tetrafluoro-1,3-butadiene with nitric oxide.
21. A copolymer of 1,1,4,4-tetrafluoro-1,3-butadiene with vinyl 2,2,3,3-tetrafluoropropionate.
22. 2-chloro-1,1,4,4-tetrafluoro-1,3-butadiene.
23. 2-phenyl-1,1,4,4-tetrafluoro-1,3-butadiene.
24. 1-chloro-1,4,4-trifluoro-2-phenyl-1,3-butadiene.
25. 2-methyl-1,1,4,4-tetrafluoro-1,3-butadiene.
26. 1,1-dichloro-4,4-difluoro-2-phenyl-1,3-butadiene.
27. 2-chloromethyl-1,1,4,4-tetrafluoro-1,3-butadiene.

References Cited by the Examiner
UNITED STATES PATENTS

| | | | |
|---|---|---|---|
| 2,647,110 | 7/1953 | Wiseman | 260—87.5 |
| 2,750,431 | 6/1956 | Tarrant et al. | 260—653 |

JOSEPH L. SCHOFER, *Primary Examiner.*

B. E. LANHAM, MILTON STERMAN, ALLEN M. BOETTCHER, *Examiners.*

UNITED STATES PATENT OFFICE
CERTIFICATE OF CORRECTION

Patent No. 3,218,303                      November 16, 1965

John Lynde Anderson et al.

It is hereby certified that error appears in the above numbered patent requiring correction and that the said Letters Patent should read as corrected below.

Column 3, line 6, for "termal" read -- thermal --; column 4, line 67, for "sk." read -- sq. --; column 5, lines 22 and 27, for "-tetrafluoro-,3-", each occurrence, read -- -tetrafluoro-1,3- --.

Signed and sealed this 6th day of December 1966.

(SEAL)
Attest:

ERNEST W. SWIDER                            EDWARD J. BRENNER
Attesting Officer                                   Commissioner of Patents